Dec. 28, 1965　　　K. K. STANGE　　　3,225,660
FLUID ACTUATED POSITIONING DEVICE
Filed Aug. 28, 1964　　　　　　　　　　　　　4 Sheets-Sheet 2
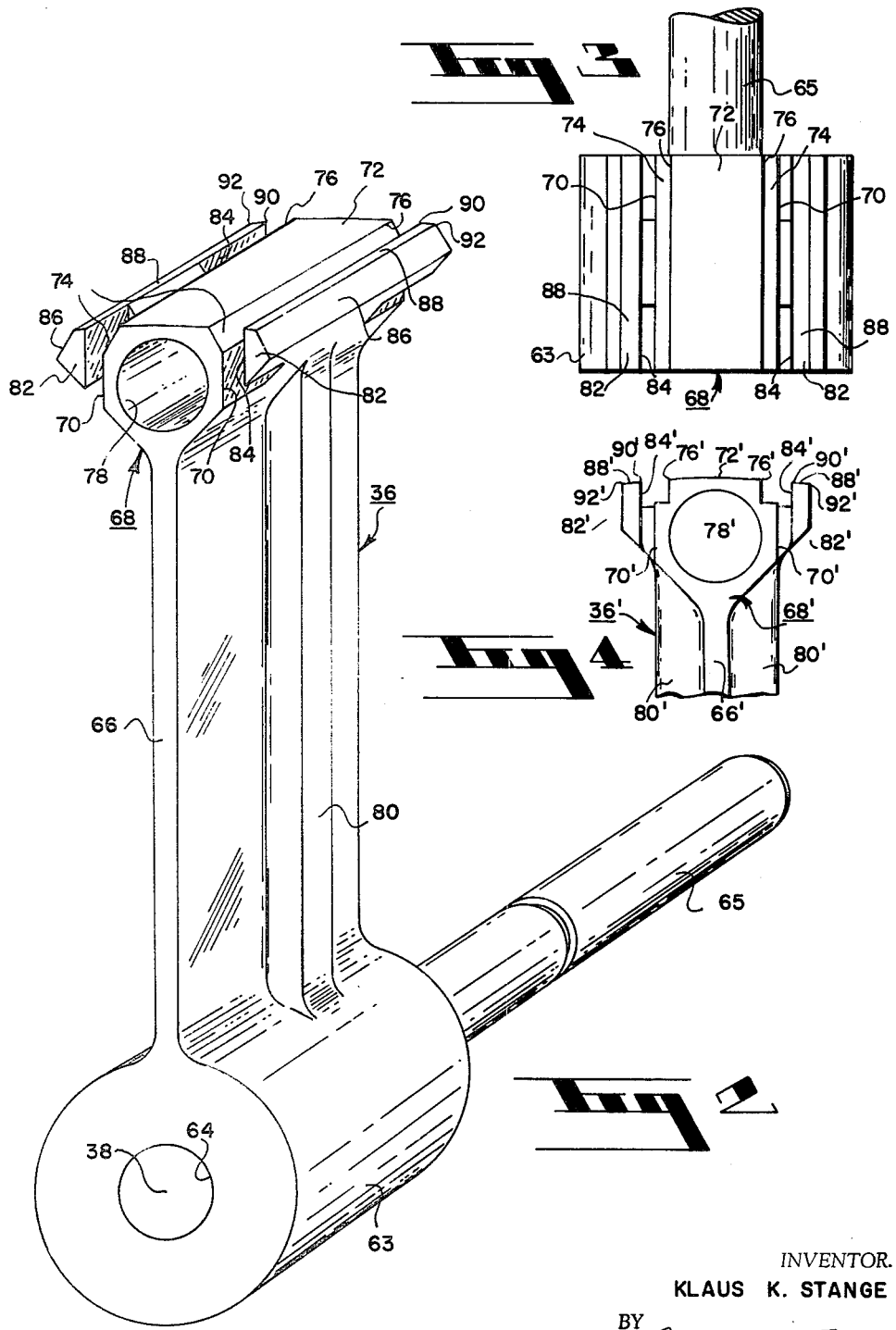
INVENTOR.
KLAUS K. STANGE
BY
ATTORNEY

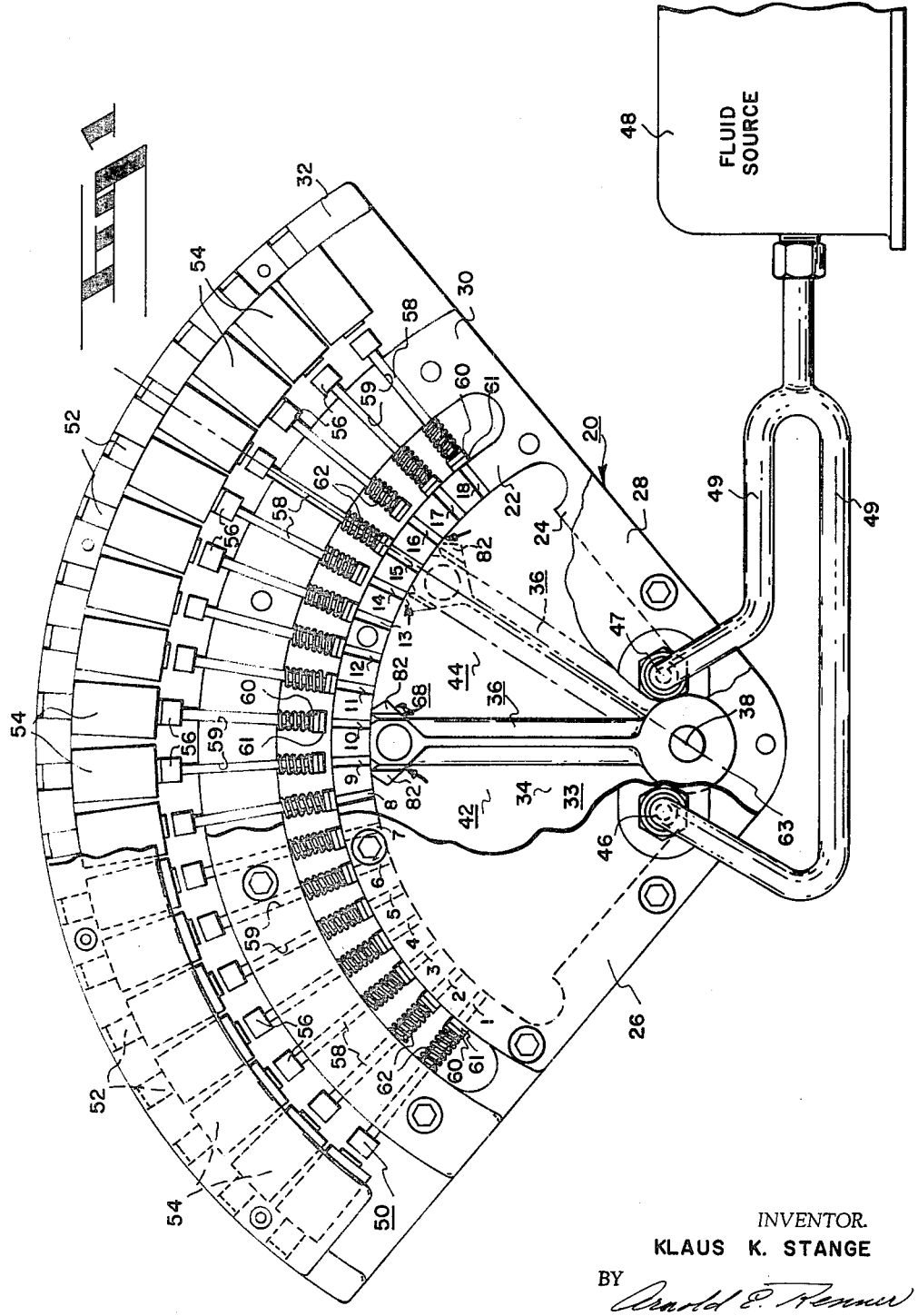

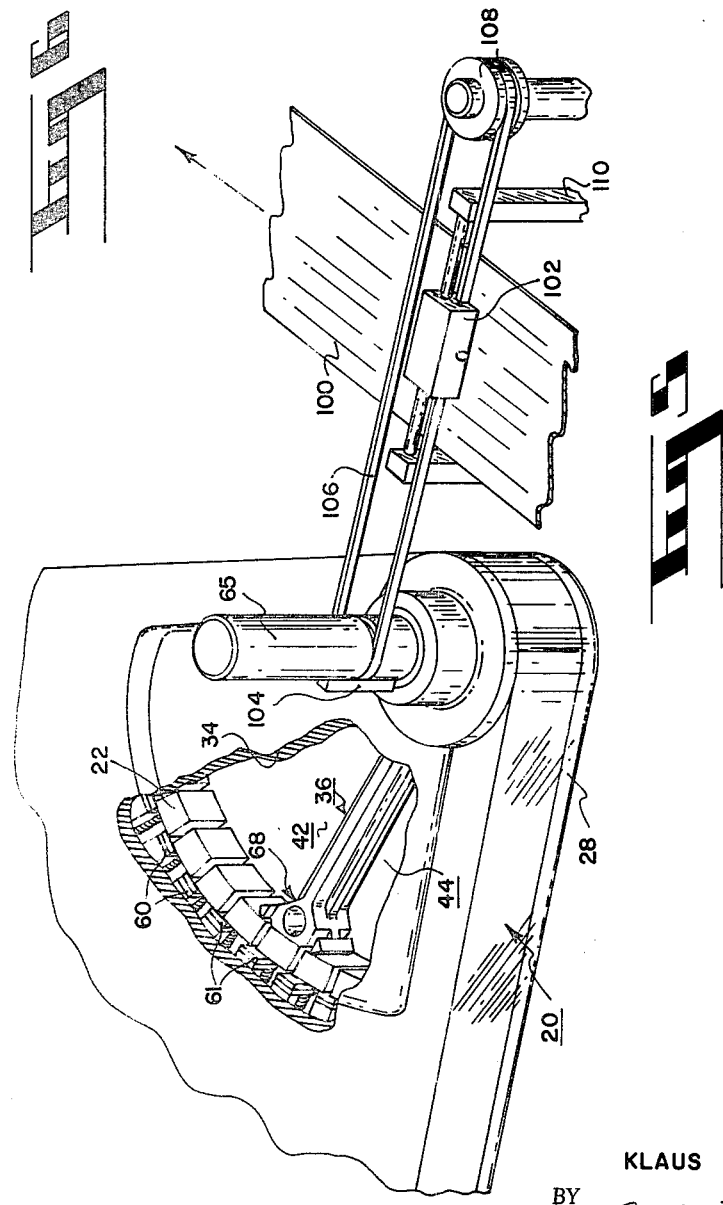
| POS. NO. | PORTS OPEN |
|---|---|
| 1 | 1 & 2 |
| 2 | 1 & 3 |
| 3 | 2 & 3 |
| 4 | 2 & 4 |
| 5 | 3 & 4 |
| 6 | 3 & 5 |
| 7 | 4 & 5 |
| 8 | 4 & 6 |
| 9 | 5 & 6 |
| 10 | 5 & 7 |
| 11 | 6 & 7 |
| 12 | 6 & 8 |
| 13 | 7 & 8 |
| 14 | 7 & 9 |
| 15 | 8 & 9 |
| 16 | 8 & 10 |
| 17 | 9 & 10 |
| 18 | 9 & 11 |
| 19 | 10 & 11 |
| 20 | 10 & 12 |
| 21 | 11 & 12 |
| 22 | 11 & 13 |
| 23 | 12 & 13 |
| 24 | 12 & 14 |
| 25 | 13 & 14 |
| 26 | 13 & 15 |
| 27 | 14 & 15 |
| 28 | 14 & 16 |
| 29 | 15 & 16 |
| 30 | 15 & 17 |
| 31 | 16 & 17 |
| 32 | 16 & 18 |
| 33 | 17 & 18 |
*INVENTOR.*
KLAUS K. STANGE
BY
ATTORNEY

| POS. NO. | PORTS OPEN |
|---|---|
| 1 | 1 |
| 2 | 1 & 2 |
| 3 | 2 |
| 4 | 2 & 3 |
| 5 | 3 |
| 6 | 3 & 4 |
| 7 | 4 |
| 8 | 4 & 5 |
| 9 | 5 |
| 10 | 5 & 6 |
| 11 | 6 |
| 12 | 6 & 7 |
| 13 | 7 |
| 14 | 7 & 8 |
| 15 | 8 |
| 16 | 8 & 9 |
| 17 | 9 |
| 18 | 9 & 10 |
| 19 | 10 |
| 20 | 10 & 11 |
| 21 | 11 |
| 22 | 11 & 12 |
| 23 | 12 |
| 24 | 12 & 13 |
| 25 | 13 |
| 26 | 13 & 14 |
| 27 | 14 |
| 28 | 14 & 15 |
| 29 | 15 |
| 30 | 15 & 16 |
| 31 | 16 |
| 32 | 16 & 17 |
| 33 | 17 |
| 34 | 17 & 18 |
| 35 | 18 |

INVENTOR.
KLAUS K. STANGE
BY
ATTORNEY

United States Patent Office 3,225,660
Patented Dec. 28, 1965

3,225,660
FLUID ACTUATED POSITIONING DEVICE
Klaus K. Stange, Phoenix, Ariz., assignor to General Electric Company, a corporation of New York
Filed Aug. 28, 1964, Ser. No. 392,822
19 Claims. (Cl. 91—51)

The present invention relates to a positioning device and more particularly to a fluid actuated device for selectively effecting any of a plurality of predetermined movements.

In many applications it is desirable to move an element or a device with respect to other elements of the total system. For example, in the computer field it may be desirable to move a transducer relative to a recording medium such as a tape or disc to thereby position the transducer for recording or reading information on one of a plurality of tracks or regions of the medium. In such applications, two factors in addition to the omnipresent ones of cost and ease of production are of primary concern. These two factors may be briefly termed as speed of operation and accuracy of positioning. It is, of course, obvious that speed of operation permits faster access times and thus avails the user of a more rapid way of recording and/or reading information. Accuracy of positioning is equally important due to the fact that, as is quite common in the art, the machine by which the information is initially recorded may not be the same machine by which the information is read from the storage medium. Alternatively, in a machine having a plurality of removable media such as magnetic discs or tapes, a given medium may be recorded at one location and read in a different location on the same machine. Thus, it is seen that by accuracy of positioning is meant not only that the individual machine will accurately reproduce its own positions, at several different locations if necessary, but also that the accuracy of the machine must be such that when the storage or recording medium is utilized on a different machine or apparatus, the second machine or apparatus will also locate its transducer at exactly the same position, with respect to the recording medium, as was done with the first machine.

It is known in the prior art that differential fluid pressures, acting between a housing and a dividing unit which are movable with respect to one another, may be utilized to effect a movement between these two elements. One form of such a device includes an acruate housing having an elongated vane which is pivotly mounted at one end. Alternatively, the vane may be held stationary and the housing free to move. In such a device, means, such as a plurality of exhaust ports equally spaced along the arcuate portion of the housing, are selectively operable to effect a reduction in pressure on one side of the vane to thereby produce a movement of the vane within the housing due to the differential pressures. When the vane becomes aligned with the selected exhaust port which is open, the pressures on either side of the vane become equalized and this, coupled with the flow of air around the vane tip, serves to center the tip at the position which is approximately the center of the exhaust port.

While devices such as have just been described have been found to operate accurately and for the most part satisfactorily, they do suffer from several limitations. The first of these limitations is that the number of positions is equal to the number of ports. Furthermore, such a device requires a separate valve means for each of the ports and each corresponding position. This tends to make the device more expensive and larger than otherwise necessary. Closely associated with these factors is the fact that, if one is to have a large number of positions, the device becomes quite large and hence the time necessary for the movable element to be positioned from one extreme position to another may become prohibitively long. Additionally, the oscillation damping time of such devices is usually quite long resulting in undue delay in the use of the element being moved by the vane.

The present invention provides a fluid actuated device which, for a given number of exhaust ports, provides almost twice the number of discrete positions as were possible with prior art devices. This is achieved without an increase in over-all size and without an increase in valving means. The present invention also possesses improved oscillation damping characteristics of the movable element. These features are achieved, in the present invention, without loss and in some cases with an improvement in operation speed.

It is, therefore, an object of the present invention to provide an improved fluid actuated positioning device.

Another object is to provide an improved fluid operated device for use in an information transfer system.

A further object is to provide a fluid operated positioning device capable of selective movement at a relatively high rate of speed.

Still another object is to provide an easily manufactured, fluid operated, positioning device which is capable of achieving a relatively large number of positions with repeated accuracy.

A still further object is to provide a fluid operated positioning device whose terminal movement is rapidly damped.

Another object of the present invention is to provide a positioning device operative through the utilization of differential fluid pressures acting on a movable element; said element being capable of rapidly assuming a relatively large number of discrete positions on a selective basis with great accuracy.

Briefly, the positioning device of the present invention is comprised of a housing having disposed therein an element which divides the housing into a plurality of fluid chambers. The housing and the dividing element are capable of relative motion. Also provided are suitable fluid input and exhaust means for supplying and exhausting fluid to and from these chambers. Through the selective operation of the exhaust means in one of the chambers, the fluid pressure therein is reduced and the resultant differential fluid pressures on the opposite sides of the dividing element effect a relative movement between the housing and the dividing element. Two pairs of fluid passageways are associated with the dividing element. The two pairs of passageways cooperate with two modes of exhaust means operation to provide two types of positioning between the housing and the dividing element. As an example, assume the device includes a stationary housing and a movable vane. Upon the opening two immediately adjacent exhaust means or ports (a first mode of operation), the vane will position itself with its center line centered between the two open ports (a first type of position). If one of the open ports is now closed and the closed port immediately adjacent thereto opened, thus making alternately adjacent ports open (a second mode of operation), the vane will position itself with its center line centered between these two open ports (a second type of position). In the second type of position, the vane center line will be aligned with the closed exhaust port between the two open ports.

The following comparison may be made between the operation of the device of the present invention and that of the prior art. In the prior art, the vane positions itself at any of the ports and the total number of vane positions possible is equal to the total number of ports. As a term of reference, the distance between successive vane positions of prior art devices may be called a step. In the operation of the device of the present invention, the vane may be made to move in half-steps. Thus, comparing the prior art and the present invention, both having the same number of exhaust ports, it is seen that the device of the present invention is capable of providing approximately twice as many discrete positions as a device of the prior art. In further comparison, assuming devices of comparable size, it is seen that the distance the vane must travel between successive positions is twice as great in the prior art as in the present invention. Having a smaller distance to travel, the response time of the present invention is less than that of the prior art.

Further objects and advantages of the invention will become apparent as the following description proceeds and features of novelty which characterize the invention will be pointed out in particularity in the claims annexed to and forming a part of this specification. For a better understanding of the present invention, reference is made to the accompanying drawings in which:

FIG. 1 is a top plan view, partially broken away, of one embodiment of the present invention;

FIG. 2 is an enlarged perspective view of the dividing element of the device of FIG. 1;

FIG. 3 is a top plan view of the element of FIG. 2;

FIG. 4 is a view, in side elevation, of a modification of the element illustrated in FIG. 2;

FIG. 5 is a perspective, fragmentary view of the device shown in FIG. 1 illustrating a possible application of the positioning device of the present invention for the movement of an element external to the device;

FIG. 6 is a chart illustrating, in tabular form, the number of positions available in the device illustrated in FIGS. 1 through 5 and setting forth the relationship between these available positions and the exhaust means utilized used to achieve these positions;

Figure 7:
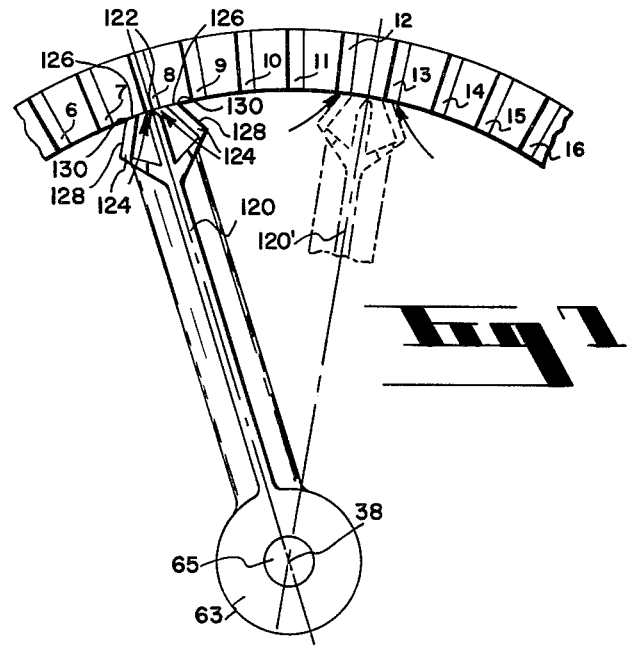
FIG. 7 is a fragmentary view showing another modification of the movable element of FIG. 1 and illustrating its positioning with respect to the exhaust means.

With specific reference now to FIGS. 1 through 3, there is shown the positioning device of the present invention in a first embodiment. The first embodiment includes a housing 20 comprising two parallel walls or plates 28 and 34 separated by an arcuate wall 22 and two connecting end walls 24 and 26. Also included are two additional walls 30 and 32 of substantially arcuate configuration, which serve as a supporting means for certain elements within the device as will be more fully explained as this description proceeds. The arcuate wall 22, the two walls 24 and 26 and the top and bottom plates 28 and 34 all taken together form a cavity 33 which is divided into two fluid chambers 42 and 44 by a pivotally mounted arm indicated generally by 36. Arm 36 is free to pivot about its axis 38 and to move within the cavity 33. While it is not necessary that the plates 28 and 34 form air tight joints with the walls 22, 24 and 26, the plates should mate with these walls and be sufficiently secured thereto to prevent the escape of an appreciable amount of fluid.

Spaced along the major portion of the length of the arcuate wall 22 are a plurality of slots, designated 1 through 18 inclusively, which form fluid exhaust ports. These ports may be in the form of a rectangular slots which extend through the wall 22 for substantially the full height thereof.

Through suitable means, for example two fluid input ports 46 and 47, fluid is introduced from a source 48 through suitable transmitting means 49 to each of the two chambers 42 and 44. The fluid input ports 46 and 47 are two apertures which extend through the plate 28, one on either side of the arm 36. While the exact position of the fluid input ports 46 and 47 is not of prime importance in the present invention, it has been found advantageous to position these ports near the pivot point of the arm 36 and in a manner such that fluid flow is normal to the plane of the plate 34. By so positioning, it has been found that the fluid flow from the input ports is not directed directly against the arm 36.

Associated with each of the exhaust ports 1 through 18 is a valve mechanism indicated generally by the reference character 50. While the valve mechanisms 50 may take on any of a large variety of forms, those illustrated are of the solenoid actuated type. Very briefly, each valve is comprised of a solenoid core 52 around which is formed an electrical coil 54 such that a passage of electrical current through the coil 54 will result in magnetization of the core 52. The core 52 and the coil 54 are supported by wall 32 and the top and bottom plates 28 and 34. Each valve mechanism also includes an armature assembly which is comprised of an enlarged head portion 56, of a magnetic material such as soft iron, to which is affixed a valve stem 58 extending through and guided by a suitable slot 59 in the wall 30. Located at the other end of the valve stem 58 is an enlarged portion 60 to which is attached a valve sealing member 61 of a suitable material such as neoprene. A compression spring 62 urges the valve downwardly, as shown in FIG. 1, to normally close the exhaust port. When an electrical current of appropriate magnitude is passed through the coil 54, by control means which have not been illustrated, the magnetic forces generated will attract the head portion 56 to the core 52, against the action of the spring 62, to open the valve and hence the exhaust port. The open exhaust port condition is illustrated in FIG. 1 at exhaust port positions 9 and 10. As has been stated, the exact mechanism of the valve assemblies is not important to the invention; the only requirement being that each of the mechanisms is independently operable to open selected ones of the exhaust ports 1 through 18.

The general organization described above may be considered as one environment in which the present invention may be utilized. However, as previously stated, it is a purpose of the present invention to provide a relatively larger number of possible positions to which this actuated device is rapidly moved and accurately positioned. To this end, the combination of a particular configuration of a movable element, with selectively operable exhaust ports is provided.

With reference now to FIGS. 2 and 3 there is shown an enlarged view of the movable element or arm of the device of FIG. 1. The movable element or arm 36 is mounted on and fixed to a shaft 65. Extending radially from a base 63 of the arm 36 is a substantially flat vane 66 upon the opopsite sides of which fluid pressure operates in a manner to be more fully described. The vane 66 has a width which is equal approximately to the depth of the cavity 33; i.e. a width corresponding to the normal distance between the top and bottom plates 28 and 34.

At the upper end of the arm 36 there is provided an air directing head 68 which may have several configurations. In FIG. 2 it is illustrated as having flat surfaces 70 which lie in planes substantially parallel to the surfaces of the vane 66. At the end of the head 68 is a surface 72 which is slightly curved such that it will substantially mate with the inside surface of the arcuate wall 22 (FIG. 1). The width of surface 72 is such that the two longitudinal edges 76 thereof are spaced a distance corresponding approximately to the distance between two adjacent exhaust ports 1 through 18. For fluid dynamic purposes, beveled surfaces 74 have been provided between the end surface 72 and the side surfaces 70.

Extending longitudinally along the length of the vane 66, positioned on either side thereof, are two ribs 80. Ribs 80 serve to rigidify the vane 66 and also serve to support a pair of outer head members 82, one on either side of the head 68. The outer head members 82 are provided with substantially flat inner surfaces 84, spaced from and lying in planes substantially parallel to the surfaces 70 of the head 68. The outer areas of the outer heads 82 are provided with beveled surfaces 86 for fluid dynamic purposes as are the surfaces 74 of the head 68. While the outer heads 82 are illustrated to be substantially triangular in shape, it is noted that the uppermost region of each of the heads 82 is provided with a flattened surface 88 which lies in substantially the same curved plane as does the surface 72. To prevent the possibility that a single outer head, acting alone, might tend to center itself on the first open exhaust port that it passes, the width of the surfaces 88 defining inner edges 90 and outer edges 92 is preferably slightly greater than one-half the width of an exhaust port. The spacing between the iner edges 90 of the two outer heads 82 is equal approximately to the distance between an odd number of exhaust ports, such as three, as is best illustrated by the phantom line showing of arm 36 in FIG. 1. It will be noted that in this position the edges 90 align themselves approximately with the inner walls of the respective exhaust ports while the outer edges 92 are located at approximately the center of the exhaust ports.

From the foregoing description it is seen that a first pair of fluid passageways is provided between the head 68 and the pair of outer heads 82 as defined by the two parallel surfaces 70 and 84 on each side of the head. A second pair of fluid passageways is provided between the outside of the beveled surfaces 86 and the respective exhaust port walls.

The operation of the device of the present invention is as follows. Assume for the purpose of this description that the actuating fluid being utilized is air, although other fluids may be utilized. Initially the arm 36 may be in any position, for example that indicated as position #28 which is the position of phantom line arm 36 (FIG. 1).

Each of the fluid inputs 46 and 47 is connected to a source 48 of air pressure which is positive with respect to the air pressure at the exit side of the exhaust ports 1 through 18 such that equal air pressures are applied to each of the input ports. With this air pressure input and with all the exhaust ports 1 through 18 in the close condition, the arm will remain at rest inasmuch as the pressure on both sides of the arm is the same. It might be pointed out at this point in the description that it is not necessary that the arm form an air tight joint between the top and bottom plates 28 and 34, and that a small seepage of air here or elsewhere will not effect the operation of the device as during the steady state operation, both sides of the arm are maintained at equal pressures.

If it is now desired that the arm achieve a position such as is illustrated by the solid line depiction of the arm 36 in FIG. 1, exhaust ports 9 and 10, corresponding to position #17, are opened by actuating the two valve mechanisms associated with these ports. When these two ports are opened the pressure on the left-hand side of the arm (fluid chamber 42) will decrease to a value lower than that present on the right-hand side of the arm (chamber 44) and the arm will rotate about its axis 38 in the counterclockwise direction. The arm will continue to so rotate until such time as the two inner fluid passageways, those between surfaces 70 and 84, are in substantial alignment with the two adjacent open exhaust ports 9 and 10. At this time, each of the chamber 42 and 44 is connected to atmosphere via one of the pair of inner passageways. As such, the pressures in the chambers 42 and 44 will once again equalize and the arm 36 will become stationary at that point. While the equalization of air pressure in the chambers is the primary determinate of arm position, it should be pointed out that the air flow across the beveled surfaces 74 also serves to accurately align the arm. The arrows in FIG. 1 illustrate this flow of air. This position of the arm, wherein the center line of the arm lies centered between the two immediately adjacent ports, may be termed a first type of positioning.

While there will, of course, be some overshoot due to the momentum of arm 36, several factors serve to limit this overshoot and reduce subsequent oscillation to a minimum. These factors include an air cushioning effect by the lower pressure chamber as the effective exhaust port size is reduced by the presence of the head adjacent the port. Additionally, the particular head construction described provides damping of the arm as it passes open exhaust ports. This damping may be explained, with reference to the movement just described, by visualizing that as the arm 36 moves counterclockwise and the leading edge of the left outer head 82 approaches open exhaust port 10, air flow on the beveled surface 86 will tend to force the arm 36 in the clockiwse direction. This same effect is also present as this surface approaches open port 9 and as other surfaces approach open ports.

The second type of position for the arm 36 is illustrated by the phantom line showing of the arm. Whereas in the preceding example immediately adjacent ports, i.e., ports 9 and 10, were open, the second type of position is effected by the opening of alternately adjacent exhaust ports, for example ports 14 and 16. Starting at the just described position #17, corresponding to open ports 9 and 10, assume that it is now desired to move the pointer to position #28—that position depicted by the phantom line arm 36. Exhaust ports 9 and 10 are closed and exhaust ports 14 and 16 opened. Ports 14 and 16 are now connected to atmosphere allowing the pressure in the right fluid chamber 44 to decrease to a value lower than that of the left chamber 42. The arm 36 will now move to the right or in the clockwise direction. In this case, ports 14 and 16 are open and movement of the arm will continue until the outer edge 92 of the right head 82 is in substantial alignment with the exhaust port 16 and the outer edge 92 of the left head 82 is in alignment with the exhaust port 14. However, in distinction to the previously described type of positioning, it is noted, as shown by the arrows associated with the phantom line illustration, that the air flow is against the outer beveled surfaces 86 of the heads 82, or, through the second pair of fluid passageways. As before, damping of the arm is achieved through the several factors including the air cushion effect in the right chamber 44 and also by the air flow against the various surfaces as they pass the open ports.

From the foregoing it is seen that two modes of positioning are available in the device of the present invention. The first of these modes is present when two immediately adjacent exhaust ports are open and the second mode of positioning is achieved when two alternately adjacent exhaust ports are open. An extension of this concept makes obvious the fact that the exhaust ports need not be immediately and alternately adjacent, as has been illustrated, but that these two modes of positioning are achieved in accordance with the present invention when there is included in the design a first pair of fluid passageways spaced apart a distance substantially equal to the distance between an even number of exhaust ports and a second pair of fluid passageways spaced apart a distance substantially equal to the distance between an odd number of exhaust ports.

An additional factor which requires consideration is the relative capabilities of the input and exhaust ports. In order to obtain a proper reduction in pressure in one of the fluid chambers (42 or 44), it is desirable that each of the exhaust ports 1 through 18 have a greater fluid handling capacity than either of the input ports 46 or 47. This feature may be achieved, without special fluid restriction devices, merely by the proper selection of relative sizes between the input and exhaust ports.

FIG. 4 illustrates one possible modification to the head 68 of the movable arm 36. This configuration differs primarily from that of FIGS. 2 and 3 in that the beveled portions have not been included and that the design is substantially a straight line configuration. The relationship between the various elements is substantially the same as that described with respect to FIGS. 2 and 3 and the same characters with a prime notation have been utilized to designate the various elements in this figure. However, because of the great similarity between the two configurations, further discussion of the design illustrated in FIG. 4 is not considered necessary.

FIG. 6 illustrates, in tabular form, the number of arm positions available, in the particular configurations of FIGS. 1 to 4, utilizing the concept of the present invention. A quick survey of the tabulation shows that, whereas in a prior art device of 18 exhaust ports there would be 18 possible positions, with the device of the present invention these same 18 ports give a total of 33 possible positions. While the tabulation of FIG. 6 appears to be self-explanatory and a detailed explanation is not here deemed warranted, the chart shows that position 17 corresponds to open exhaust ports 9 and 10 while position 18, immediately adjacent to position 17, results from an opening of ports 9 and 11. In position 18 the air flow would correspond to that as is illustrated in FIG. 1 by the phantom line arm 36 (position 28); the difference being that the arm would be only slightly displaced from the position of the vane shown by solid lines in FIG. 1. It is, of course, obvious that a greater or lesser total number of exhaust ports could be utilized in accordance with demands of the ultimate use in the positioning device. A general formula which may be derived shows that the maximum number of positions available for a device of this general design is three less than two times the total number of exhaust ports.

FIG. 5 illustrates one of many possible uses for a positioning device such as has been described. Included in FIG. 5 is a tape 100 which may contain information written and stored thereon in the form of magnetic charges arranged in a plurality of longitudinally extending channels. This tape is caused to move in the direction of the arrow by any suitable means which have not been shown. The positioning device of the present invention is utilized to move a reading head or transducer 102 across the tape in a direction normal to the direction of tape movement in order to read a particular one of the channels of information written on the tape 100. The transducer 102 is mounted on a suitable guide 110 which permits transducer motion across the width of the tape but limits motion in any other direction. A suitable motion translating means such as a flexible metal band 106 extends between the post 65 and a free running pulley 108 and is connected to the transducer 102. The band 106 is secured to the post 65 by a suitable means such as a clamp 104. Thus, movement of the arm will accurately and rapidly effect the movement of the transducer head 102 a predescribed distance. While the device of the present invention positions itself quite accurately, in the illustrated application of FIG. 5 further accuracy is achieved through the ratio of active arm length to the radius of the post 65. For example, a ratio of six to one in these dimensions will result in a transducer placement error of only one-sixth the placement error in the arm.

In an actual device built in accordance with the present invention the following parameters were utilized. These parameters are given by way of example and not as a limitation. The device was operated with a positive air pressure at the input ports of approximately three pounds per square inch and the exhaust ports were open to atmosphere. The distance from the pivot point to the furthermost point of the arm was approximately 3½ inches, and the spacing between successive exhaust ports approximately 6 degrees. In this example, the transducer head weighed approximately one pound and was moved over a total distance of approximately one inch. With these conditions prevailing, it was found that the mean positioning time from any first position to a second position was approximately 70 milliseconds and that the maximum time from any position to a subsequent position was approximately 100 milliseconds. The time taken to achieve adjacent positions was found to be approximately 45 milliseconds. All of the above times were measured from the initiation of the control signals to the solenoids to the time when the arm has substantially ceased oscillation. The elapsed time from the initiation of a solenoid control signal to the opening of an exhaust port was found to be approximately 15 milliseconds.

Referring now to FIG. 7, there is shown a device of the present invention in another embodiment. This embodiment may be utilized in any suitable structure, for example a housing similar to that shown in FIG. 1. For the sake of simplicity, only a portion of the arcuate wall 22 and only exhaust ports 6 through 16 have been shown in FIG. 7.

The movable element in the present embodiment includes a vane 120, which corresponds to the vane 66 of the previous embodiments. A tip 122, provided at the outer end of the vane 120, is of reduced cross-sectional area so as to be incapable of completely closing an exhaust port. Considering only the thus far described structure, the opening of a single exhaust port will result in the positioning of the movable element at that port. Fluid flowing on either side of the tip 122 will serve to center the movable element at the center of the open exhaust port.

The device of this embodiment, however, also includes two outer heads 124 which are supported from the vane 120 and are positioned on the right and left hand sides of the tip 122. Each of the heads 124 includes a flattened surface 126 which corresponds to and is dimensioned similar to the surfaces 88 of the earlier embodiments. Each of the heads 124 also includes a substantially flat surface 128 (corresponding to surfaces 86 in FIG. 2) which joins with a respective surface 126 to form leading edges 130. The leading edges 130 of the FIG. 7 embodiment are spaced apart a distance substantially equal to the distance between an integral number of exhaust ports. In FIG. 7, this integral number is two.

It is seen that in this embodiment there also exists two pairs of fluid passageways. The passageways of the first pair are on each side of the tip 122. These passageways serve to position the element when a single exhaust port is open. The second pair of fluid passageways exists to the outside of the heads 124 and the fluid acting against the surfaces 128 thereof serves to position the movable element when two adjacent exhaust ports are open. This latter mode of operation is illustrated by the vane 120' shown in phantom in FIG. 7.

Figures 8, 9:
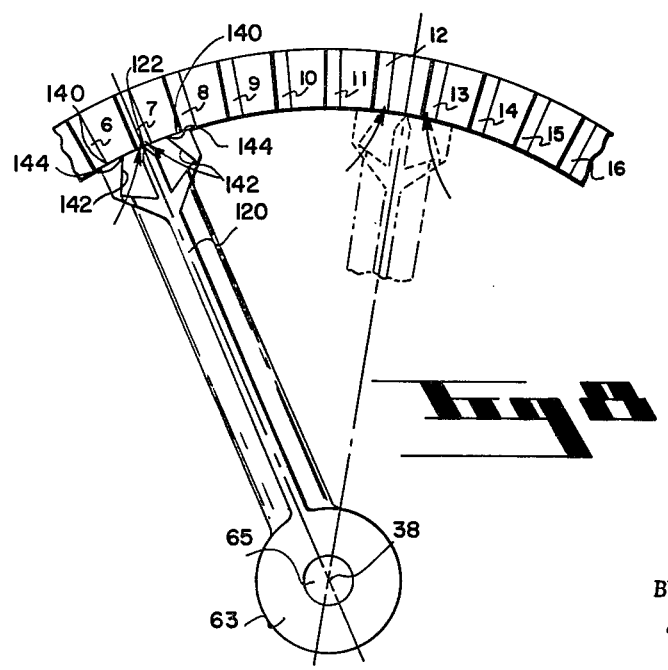
FIG. 8 is a fragmentary view showing a modification of the movable element illustrated in FIG. 7 and also showing its positioning with respect to the exhaust means; and, FIG. 9 is a chart, similar to that of FIG. 6, setting forth the relationship between available positions and exhaust means utilized for the embodiments illustrated in FIGS. 7 and 8.

In FIG. 8 there is shown a modification of the device of FIG. 7. This embodiment differs from that of FIG. 7 primarily in the configuration of the outer heads. In the FIG. 8 embodiment the outer heads each include a flat surface 140 which has a width greater than the width of the exhaust ports. Each head is also provided with an inclined flat surface 142 which joins with a respective surface 140 to form edges 144. Edges 144 are spaced apart a distance substantially equal to the distance between an integral number of exhaust ports. In FIG. 8 this integral number is two as is best seen in the phantom view of the arm.

In operation, the embodiment of FIG. 8 is very similar to that of FIG. 7. If only one exhaust port is rendered effective the first pair of fluid passageways is such that fluid acting on both sides of the tip 122 serves to position the device at that open port for a first type of positioning. If two adjacent ports are open, the second pair of fluid passageways, which in this embodiment actually occupy essentially the same regions as the first pair of passageways, are such that the fluid acting on the surfaces 142 (see arrows in phantom illustration) serves to position the device with the edges 144 at the approximate midpoints of adjacent exhaust ports for a second type of positioning.

The tabulation of FIG. 9 sets forth the relationship between the possible positions and the respective port openings for these positions for the embodiments of FIGS. 7 and 8. It is noted that, utilizing this type of arm head, the same 18 exhaust ports as were illustrated with respect to FIGS. 1 through 3, produce 35 possible positions. A general formula for this type of head is that the total number of positions possible is one less than two times the number of exhaust ports.

While the latter type of arm head, when compared with the earlier embodiment type, enjoys the advantage of a greater number of possible positions, it also has one disadvantage when compared with the earlier described type. This disadvantage is that in this latter type the rate of movement is not uniform. In the earlier type (FIGS. 1 to 4), regardless of the movement to be executed, two exhaust ports were opened and hence the rate of exhaust was substantially uniform. In the later embodiments (FIGS. 7 and 8), sometimes one and sometimes two exhaust ports are opened, resulting in a variation of exhaust rate. Inasmuch as the rate of exhaust, in part, determines the rate of pressure reduction in the fluid chamber, it then determines in part the differential pressures acting on the arm which in turn affects the rate of arm movement. Thus, it is readily seen that, as a general rule, the arm will be displaced at a greater rate of speed when two exhaust ports are opened than when only one exhaust port is opened. The accuracy of positioning of each of the general two types of heads is substantially the same. However, if in one's particular application, a relatively large variation in arm speed is not objectionable, it may be advantageous to employ the configuration illustrated in FIGS. 7 and 8.

While there have been shown and described several embodiments of the invention, modifications thereto will readily occur to those skilled in the art. For example, the fluid input ports could be open to atmosphere and by suitable means the exhaust ports be connected to a partial vacuum. Likewise, a pressure and vacuum arrangement in combination could be utilized. A further modification, not readily apparent, is that the present invention is not limited to an arcuate type device such as has been shown but may well take the form of a full circle or of a linear piston type device moving within a cylinder. Therefore, while the principles of the invention have now been made clear in the illustrative embodiment, there will be immediately obvious to those skilled in the art many modifications of structure, arrangement, proportions, the elements, materials and components, used in the practice of the invention, and otherwise, which are particularly adapted for specific environments and operating requirements without departing from these principles. The appended claims are therefore intended to cover and embrace any such modification, within the limits only of the true spirit and scope of the invention.

What is claimed is:

1. An information transfer system comprising information storage means; a transducer operatively associated with said storage means for effecting an information transfer therewith; and positioning means connected to said transducer for moving said transducer with respect to said storage means, said positioning means comprising: a housing; a dividing element disposed within said housing for substantially dividing said housing into a plurality of fluid chambers, said housing and said element being relatively movable; a fluid input to each of said fluid chambers, a plurality of fluid exhaust means arranged such that at least one of said exhaust means is in communication with each of said fluid chambers at all times; means for selectively rendering each of exhaust means effective; and means operatively associated with said dividing element defining first and second pairs of fluid passageways, said first pair of fluid passageways acting in cooperation with a first mode of rendering selective exhaust means effective to effect a first type of positioning between said housing and said dividing element and said second pair of fluid passageways acting in cooperation with a second mode of rendering selective exhaust means effective to effect a second type of positioning between said housing and said dividing element.

2. In an information transfer system, information storage medium; a transducer operatively associated with said storage medium for effecting an information transfer therewith; and means for moving said transducer with respect to said storage medium including a fluid operated positioning device, said device including a housing having therein a dividing element separating said housing into a plurality of fluid chambers, said housing and said element being relatively movable, a source for supplying a fluid under pressure to each of said chambers, a plurality of selectively operable exhaust ports for effecting a reduction in fluid pressure in one of said chambers to effect said movement between said housing and said dividing element, said dividing element having associated therewith first and second pairs of fluid passageways acting respectively with first and second modes of exhaust port operation to thereby effect, respectively, first and second types of positioning, and means connecting said positioning device and transducer to transmit the motion of said device to said transducer.

3. An information transfer system comprising: an information storage medium; a transducer operatively associated with said storage medium for effecting an information transfer therewith; and means for moving said transducer with respect to said storage medium comprising: a housing; a movable element disposed within said housing; said movable element substantially dividing said housing into a plurality of fluid chambers; a fluid input for supplying each of said chambers with a fluid under pressure; a plurality of fluid exhaust ports in communication with said fluid chambers; selectively operable valve means whereby said exhaust ports selectively connect one of said fluid chambers to a region at fluid pressure less than that of said fluid input; means associated with said movable element defining first and second pairs of fluid passageways, the passageways of said first pair spaced from one another a distance substantially equal to the distance between an even number of exhaust ports and the passageways of said second pair spaced from one another a distance substantially equal to the distance between an odd number of exhaust ports; and means connecting said movable element and said transducer for transmitting motion from said movable element to said transducer.

4. A fluid operated positioning device comprising a housing; a dividing element disposed within said housing for substantially dividing said housing into a plurality of fluid chambers, said housing and said element being relatively movable; a fluid input to each of said fluid chambers; a plurality of selectively operable exhaust ports; and means defining first and second pairs of fluid passageways, said fluid exhaust ports forming a part of one of said housing and said element, and said means defining said passageways forming a part of the other of said housing and said element; said first pair of fluid passageways acting in cooperation with a first mode of rendering selective exhaust ports effective to effect a first type of positioning between said housing and said dividing element and said second pair of fluid passageways acting in cooperation with a second mode of rendering selective exhaust ports effective to effect a second type positioning between said housing and said dividing element.

5. In a fluid operated positioning device of the type in which differential fluid pressures acting upon a movable element serve to move said element; a plurality of fluid exhaust means selectively operable to effect a reduction in fluid pressure on one side of said movable element and means operatively associated with said movable element defining first and second pairs of fluid passageways, said first pair of fluid passageways operative in conjunction with a first mode of rendering selective exhaust means effective to effect a first type of positioning of said movable element and said second pair of fluid passageways operative in conjunction with a second mode of rendering selective exhaust means effective to effect a second type of positioning of said movable element.

6. A fluid operated positioning device comprising: a housing; an element disposed within said housing for substantially dividing said housing into a plurality of fluid chambers, said housing and said element being relatively movable; a fluid input to each of said fluid chambers; a plurality of fluid exhaust ports arranged such that at least one of said exhaust ports is in communication with each of said fluid chambers at all times; means for selectively rendering each of exhaust ports effective; and means operatively associated with said element defining first and second pairs of fluid passageways, said first pair of fluid passageways acting in cooperation with a first mode of rendering selective exhaust ports effective to effect a first type of positioning between said housing and said element and said second pair of fluid passageways acting in cooperation with a second mode of rendering selective exhaust ports effective to effect a second type of positioning between said housing and said element.

7. In a fluid operated positioning device of the type in which differential fluid pressures acting on a movable element serve to move said element, a plurality of equally spaced exhaust means selectively operable to effect a fluid pressure reduction on one side of said movable element and means forming a part of said movable element defining first and second pairs of fluid passageways, the passageways of said first pair of fluid passageways spaced apart a distance substantially equal to the distance between an even number of exhaust means and the passageways of said second pair of fluid passageways spaced apart a distance substantially equal to the distance between an odd number of exhaust means.

8. In a fluid operated positioning device of the type in which differential fluid pressures acting on a movable element serve to move said element, a plurality of equally spaced exhaust ports selectively operable to effect a fluid pressure reduction on one side of said movable element and means forming a part of said movable element providing first and second pairs of fluid passageways, said first pair of fluid passageways spaced a distance substantially equal to the distance between immediately adjacent exhaust ports and said second pair of fluid passageways spaced a distance substantially equal to the distance between alternately adjacent exhaust ports.

9. In a pneumatically operated positioning device of the type in which a difference in air pressures operating on opposite sides of a pivotally mounted vane serves to pivot said vane about its axis, a plurality of equally spaced exhaust ports selectively operable to effect an air pressure reduction on one side of said vane and means associated with said vane defining first and second pairs of air passageways, said first pair of air passageways spaced a distance substantially equal to the distance between an even number of exhaust ports and said second pair of air passageways spaced a distance substantially equal to the distance between an odd number of exhaust ports.

10. A fluid pressure operated positioning device of the type in which differential fluid pressures operating on a movable element serve to move said element comprising: a movable element; a plurality of equally spaced exhaust ports selectively operable to effect a fluid pressure reduction on one side of said movable element; and means forming a part of said movable element defining first and second pairs of fluid passageways, said first pair of fluid passageways spaced a distance substantially equal to the distance between immediately adjacent exhaust ports and said second pair of fluid passageways spaced a distance substantially equal to the distance between alternately adjacent exhaust ports, said first pair of fluid passageways acting, upon the opening of only two immediately adjacent exhaust ports to center said movable element between said two immediately adjacent exhaust ports and said second pair of fluid passageways acting, upon the opening of only two alternately adjacent exhaust ports to center said movable element between said two alternately adjacent exhaust ports.

11. A positioning device comprising: a housing; a dividing element disposed within said housing for dividing said housing into two fluid chambers, said housing and said dividing element being relatively movable; means for supplying fluid under pressure to each of said fluid chambers; a plurality of fluid exhaust means connected to said fluid chambers and arranged such that at least one of said exhaust means is in communication with each of said chambers at all times; a selectively operable valve associated with each of said exhaust means whereby selected ones of said exhaust means are effective to exhaust fluid from one of said fluid chambers; and means associated with said dividing element comprising first and second pairs of fluid passageways, the passageways of said first pair spaced from one another a distance substantially equal to the distance between an even number of exhaust means and the passageways of said second pair spaced from one another a distance substantially equal to an odd number of exhaust means.

12. A positioning device comprising: a housing; a dividing element disposed within said housing for dividing said housing into a plurality of fluid chambers, said housing and said dividing element being relatively movable; fluid input means for supplying pressurized fluid to each of said fluid chambers at substantially equal pressures; a plurality of fluid exhaust means connected to said fluid chambers and arranged such that at least one of said exhaust means is connected to each of said chambers at all times; a valve operably associated with each of said exhaust means whereby said exhaust means selectively connect one of said fluid chambers to a region of lower fluid pressure than that of said fluid input; and means forming a part of said movable element, positioned adjacent said exhaust means, defining first and second pairs of fluid passageways, said first pair of passageways spaced a distance substantially equal to the distance between immediately adjacent exhaust means and said second pair of fluid passageways spaced a distance substantially equal to the distance between alternately adjacent exhaust means.

13. A positioning device comprising: a substantially arcuate housing; a pivotally mounted arm disposed within said housing, said arm substantially dividing said housing into two fluid chambers; a fluid input to each of said fluid chambers serving to connect each of said chambers to a source of substantially mutually equal fluid pressures; a plurality of fluid exhaust ports in communication with said fluid chambers, said fluid exhaust ports located such that at least one of said exhaust ports is in communication with each of said chambers at all times; selectively operable valve means associated with each of said exhaust ports whereby said exhaust ports selectively connect one of said fluid chambers to a region of fluid pressure less than that of said source; and means, positioned adjacent said exhaust ports, forming a part of said arm defining first and second pairs of fluid passageways, said first pair of passageways spaced a distance substantially equal to the distance between an even number of exhaust ports and said second pair of fluid passageways spaced a distance substantially equal to an odd number of exhaust ports.

14. A positioning device comprising: a substantially arcuate housing; an arm, pivotally mounted at one end, disposed within said housing and substantially dividing said housing into two fluid chambers; fluid input ports connecting each of said chambers to a common source of fluid pressure; a plurality of fluid exhaust ports, said exhaust ports located such that at least one of said exhaust ports is in communication with each of said chambers at all times; and a valve operably associated with each of said exhaust ports whereby said exhaust ports selectively connect said fluid chambers to a region of lesser fluid pressure than that of said input source; said arm including, at the free end thereof, means defining two groups of fluid passageways, the first of said groups acting in cooperation with two immediately adjacent exhaust ports to determine a first type arm position and the second of said groups acting in cooperation with two alternately adjacent ports to determine a second type arm position.

15. A fluid operated positioning device comprising: a housing; an element disposed within said housing, said element substantially dividing said housing into a plurality of fluid chambers; said housing and said element being relatively movable; fluid input means in communication with each of said fluid chambers; a plurality of exhaust means arranged such that at least one of said exhaust means is in communication with each of said fluid chambers at all times; means for selectively rendering said exhaust means effective; and means operatively connected with said element including first and second pairs of fluid passageways, said first pair of passageways spaced a distance substantially equal to the distance between an even number of exhaust means and said second pairs of passageways spaced a distance substantially equal to an odd number of exhaust means.

16. In a fluid operated positioning device of the type in which differential fluid pressures acting upon a movable element serve to move said element, a plurality of exhaust means selectively operable to effect a fluid pressure reduction on one side of said movable element, and means associated with said movable element providing first and second pairs of fluid passageways, said first pair of fluid passageways cooperating with a single operative exhaust port to effect a first type of positioning of said movable element and said second pair of fluid passageways cooperating with an integral number, greater than one, of operative fluid passageways to effect a second type of positioning of said movable element.

17. A device in acordance with claim 16 wherein said integral number is two.

18. A positioning device comprising: a housing; a movable element disposed within said housing, said movable element dividing said housing into a plurality of fluid chambers; a fluid input means for supplying fluid to each of said chambers at substantially equal pressures; a plurality of fluid exhaust ports arranged such that at least one of said exhaust ports is in communication with each of said chambers at all times; means for selectively rendering said exhaust ports effective to thereby effect a fluid pressure reduction in one of said chambers; and means forming a part of said movable element comprising means defining first and second pairs of fluid passageways, said first pair of fluid passageways cooperating with the exhaust of fluid through a single exhaust port to effect a first type of positioning of said movable element and said second pair of fluid passageways cooperating with the exhaust of fluid through at least two exhaust ports to effect a second type of positioning of said movable element.

19. A fluid operated positioning device comprising: a housing; an element disposed within said housing for the dividing of said housing into two fluid chambers, said housing and said element being relatively movable; means for supplying fluid to each of said chambers; a plurality of fluid exhaust ports in communication with said fluid chambers, means for selectively rendering said exhaust means effective; and means associated with said element defining first and second pairs of fluid passageways, said first pair of fluid passageways acting in cooperation with a single operative exhaust means to effect a first type of position between said housing and said element, and said second pair of fluid passageways acting in cooperation with two immediately adjacent operative exhaust means to effect a second type of position between said housing and said element.

References Cited by the Examiner
UNITED STATES PATENTS

| | | | |
|---|---|---|---|
| 2,735,406 | 2/1956 | Britton | 91—51 |
| 2,825,307 | 3/1958 | Enyeart | 91—51 |
| 3,066,653 | 12/1962 | Stiglic | 91—51 |

SAMUEL LEVINE, *Primary Examiner.*